June 12, 1945.  W. A. SIMMONS  2,378,251
POULTRY FOUNTAIN AND FEEDER
Filed Jan. 13, 1944
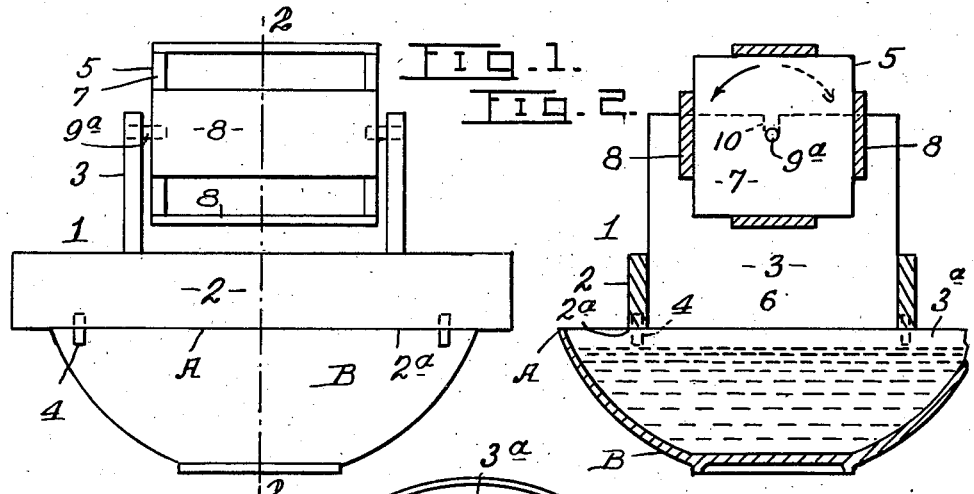
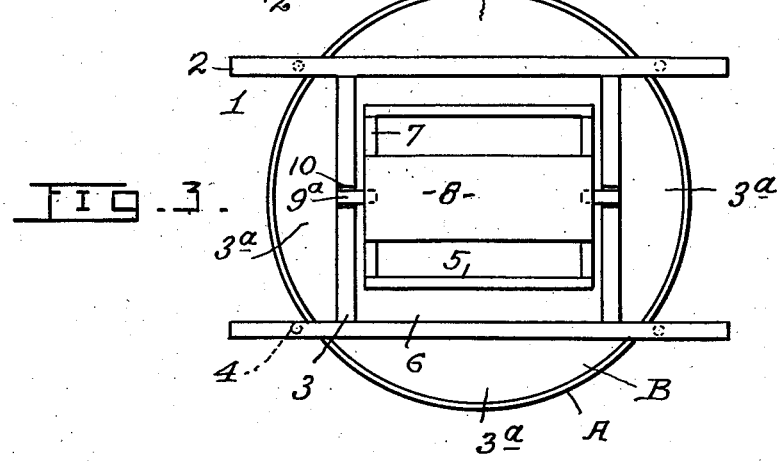
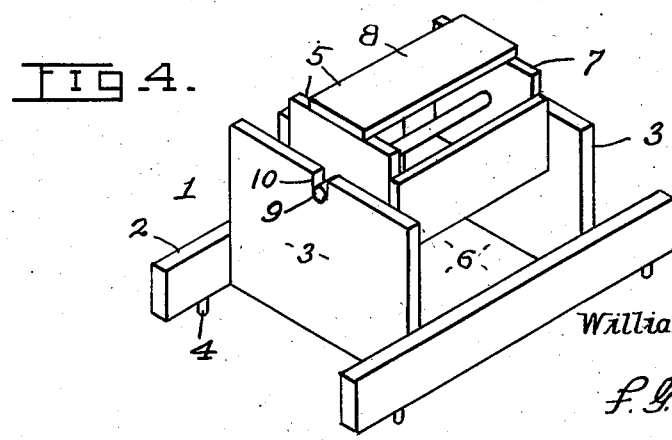
INVENTOR:
William A. Simmons,
BY
F. G. Fischer,
ATTORNEY.

Patented June 12, 1945

2,378,251

UNITED STATES PATENT OFFICE 2,378,251

POULTRY FOUNTAIN AND FEEDER

William A. Simmons, Miller, Mo.

Application January 13, 1944, Serial No. 518,189

2 Claims. (Cl. 119—61)

My invention relates to a device adapted to be applied to an ordinary crock or other receptacle for the purpose of providing a sanitary drinking fountain and feeder for poultry.

The device may be made in various sizes to rest upon the rims of receptacles of different shapes and sizes, and is so constructed and proportioned as to prevent chicks and mature fowls from perching upon the device or the rim of a receptacle or getting into the receptacle and causing wastage and pollution of the contents thereof.

The contents of the receptacle are readily accessible to fowls so long as they remain upon the ground and do not attempt to get inside of the receptacle or perch either upon the device or the rim of the receptacle.

The device is portable so that it may be readily moved from one location to another and is of simple, inexpensive and durable construction.

The device includes a substantial frame adapted to rest upon the rim of a receptacle, and a reel journaled in the frame so that if a fowl attempts to perch upon the reel the latter will become unbalanced, thus turn axially and dislodge the fowl. The reel is free to rotate either clockwise or counterclockwise.

Other features will hereinafter appear and in order that the invention may be fully understood reference will now be had to the accompanying drawing, in which:

Fig. 1 is an elevation of the device resting upon a receptacle.

Fig. 2 is a vertical cross section on line 2—2 of Fig. 1.

Fig. 3 is a plan view of the device resting upon the receptacle.

Fig. 4 is a perspective view of the device removed from the receptacle.

Referring in detail to the different parts of the device, 1 in general, designates a rectangular box-like frame comprising a pair of parallel longitudinal base members 2 and a pair of parallel upright end members 3. The base members 2 are set up edgewise to constitute longitudinal sides of the frame 1 and are adapted to support the frame upon the rim A of a crock or other receptacles B, preferably but not necessarily of circular formation and adapted to hold a supply of drinking water or feed of various kinds suitable for chicks and mature poultry.

The upright members 3 are nailed or otherwise appropriately secured at their ends to the respective base members 2, from the lower edges 2a of which they extend upwardly a suitable distance above said base members and constitute the ends of the rectangular frame 1. The base members 2 are longer than the end members 3 to rest upon and overlap the rim A of the receptacle B. The respective frame members 2 and 3 are spaced to arrange their intermediate portions so close to the rim A of the receptacle B, Fig. 3, as to constitute an effective barrier against fowls attempting to perch upon the rim or entering the receptacle through intervening feed openings 3a between the rim A and the frame members 2 and 3, respectively.

To insure proper placement of the rectangular frame 1 upon the receptacle B, I provide each base member 2 with a pair of studs or lugs 4 which are spaced to extend downward into close proximity with the sides of the receptacle.

Fowls are prevented by a reel 5 from perching upon the frame 1 or bodily entering the receptacle B through a rectangular opening 6 enclosed by the frame members 2 and 3. The reel 5 may be of any appropriate construction. In the present instance it comprises two parallel end members 7 and a plurality of longitudinal members 8 equally spaced around the end members 7, to which their ends are nailed or otherwise rigidly connected. The end members 7 may be provided with an axial shaft 9, Fig. 4, or respective trunnions 9a which are journaled in the upper central portions of the respective end members 3 of the frame 1. The reel 5 is free to rotate clockwise or counterclockwise and thus dislodge a fowl attempting to perch thereon and is so proportioned as to prevent the fowl from bodily entering the receptacle B through the opening 6 or perching upon the frame 1. The trunnions 9a are journaled in slots 10 in the upper portions of the respective end members 3, so that the reel 5 may be removed from the frame 1 to facilitate cleansing and maintenance of the device in a sanitary condition.

The device may be made of any appropriate material, such for example as wood, metals, or plastics, or a combination of the foregoing.

From the foregoing description taken in connection with the accompanying drawing, it is apparent that I have provided an efficient device whereby the drinking water and feed for poultry can be kept without wastage in a sanitary condition, and while I have disclosed one embodiment of the invention I reserve all rights to such changes and modifications thereof as properly fall within the scope of the invention as claimed.

Having thus described my invention, what I claim and desire to secure by Letters Patent, is:

1. A device of the character described comprising a pair of parallel base members adapted to be set edgewise upon the rim of a feed or water receptacle and spaced to leave respective feed openings between the outer sides of the base members and the rim of the receptacle, a pair of upright end members secured between the base members and spaced inwardly from the ends of the latter to leave respective openings between said end members and the rim of the receptacle so that access may be had to the contents of the receptacle, said end members extending above the base members and forming in conjunction therewith a rectangular bottomless frame through which access may be had to the contents of the receptacle, and rotatable means mounted upon the end members and adapted to prevent poultry from perching upon the rectangular frame or gaining bodily access to the receptacle through the open bottom of said rectangular frame.

2. A device of the character described comprising a pair of parallel base members adapted to be set edgewise upon the rim of a feed or water receptacle and spaced to leave respective feed openings between the outer sides of the base members and the rim of the receptacle, a pair of upright end members secured between the base members and spaced inwardly from the ends of the latter to leave respective openings between said end members and the rim of the receptacle so that access may be had to the contents of the receptacle, said end members extending above the base members and forming in conjunction therewith a rectangular bottomless frame through which access may be had to the contents of the receptacle, means depending from the base members to properly position the latter upon the receptacle, and a reel mounted upon the end members and adapted to prevent poultry from perching upon the rectangular frame or gaining bodily access to the receptacle through the open bottom of said rectangular frame.

WILLIAM A. SIMMONS.